(No Model.)
R. STILWELL.
ELECTRIC GALVANIC MATTRESS.
No. 285,852. Patented Oct. 2, 1883.
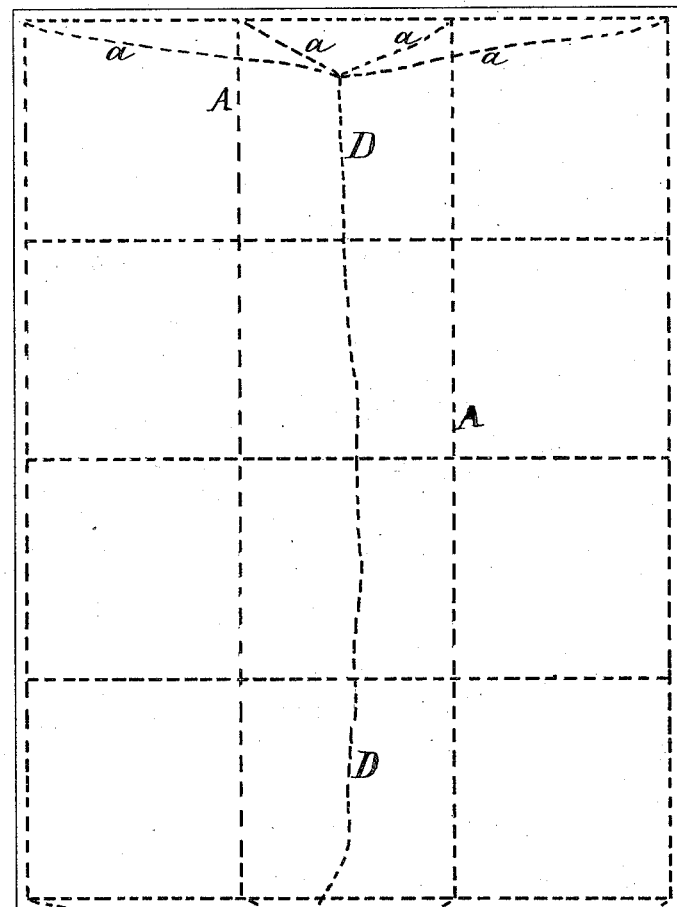
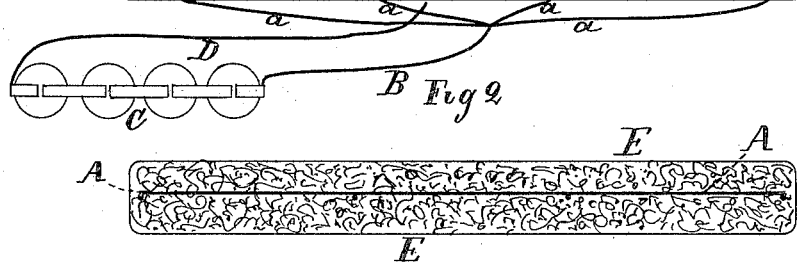
Witnesses
Rudolf H. Rillman
Edward H. Holley
Inventor
Rickason Stilwell
per
James A. Whitney
Attorney

United States Patent Office.

RICKASON STILWELL, OF NEW YORK, N. Y., ASSIGNOR, BY DIRECT AND MESNE ASSIGNMENTS, TO BRADFORD WILLARD AND EMELINE C. STILWELL, BOTH OF SAME PLACE.

ELECTRIC GALVANIC MATTRESS.

SPECIFICATION forming part of Letters Patent No. 285,852, dated October 2, 1883.

Application filed March 15, 1883. (No model.)

*To all whom it may concern:*

Be it known that I, RICKASON STILWELL, of the city, county, and State of New York, have invented an Improvement in Electric Galvanic Mattresses, of which the following is a specification.

This invention relates to that class of electrical appliances which are designed to subject the persons of sleepers to the slow or gradual action of electricity by means of currents induced through wires connected in one way or another with the mattress itself.

The object of my invention is to provide a cheap, simple, and durable mattress of the class mentioned, which will not be liable to get out of order from rough usage or from long continued use, and in which the curative effects of the electrical currents may be advantageously applied in due relation with the person of the sleeper or occupant of the mattress.

Figure 1 is a plan view of a mattress constructed according to my said invention, with the electrical wires themselves indicated in dotted outline. Fig. 2 is a transverse sectional view of the same.

In the construction of an electrical mattress according to my said invention, I prepare a frame-work, A, of metallic wire, preferably of copper, but in any case of a practically good conductor of electricity. This frame-work is composed of wires interlaced, as represented in dotted outline in Fig. 1, with meshes of any desired size—as, for example, of three inches in width, although these proportions may be varied within wide limits. Each end of this wire frame-work I connect by suitable wires, $a$, or otherwise, with the circuit-wires, one of the said circuit-wires—as, for example, B—being connected with one of the poles—as, for example, the negative pole—of a battery, C, while the opposite end is in like manner connected with a like circuit-wire, D, which connects with the other or positive pole of the battery. Having provided this wire frame-work, I place the same centrally within a mattress, E, of any suitable construction—as, for example, one filled with wool, curled hair, or other appropriate material—the frame itself being placed substantially midway between the upper and lower surfaces of the mattress, and, of course, in a plane parallel therewith.

The circuit-wires are of course capable of being disconnected from the poles of the battery.

The apparatus as thus constructed, and being duly connected with the battery, as hereinbefore described, is provided with electrical currents, which pass through all the wires of the frame aforesaid, and consequently subject the person of the sleeper to the influence or action of the electricity to an extent proportioned to the intensity of the battery, the size and number of the conducting-wires, and the proximity of the sleeper thereto, while the frame—in other words, the wires—being embedded centrally within the mattress itself, are protected from injury, and in the first instance require less care in applying and securing them in place than if they were located in a more exposed position with reference to the mattress.

It is of course to be understood that any other suitable known source of electricity may be substituted in place of the galvanic battery for providing the currents through the frame or wires, as aforesaid.

What I claim as my invention is—

A mattress composed of wool, hair, or other suitable material, and having embedded centrally therein in a plane substantially parallel with its upper and lower surfaces, a frame or wires extending substantially throughout the area of the said mattress, and provided with circuit-wires whereby it may be connected with the poles of a galvanic battery or other source of electricity, all substantially as and for the purpose herein set forth.

RICKASON STILWELL.

Witnesses:
EDWARD A. HOLLEY,
RUDOLF H. RJELLMAN.